United States Patent
Walters (10) Patent No.: US 7,530,261 B2
(45) Date of Patent: May 12, 2009

(54) FOURIER-BASED MISFIRE DETECTION STRATEGY

(75) Inventor: James E. Walters, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 117 days.

(21) Appl. No.: 11/673,885

(22) Filed: Feb. 12, 2007

(65) Prior Publication Data

US 2008/0190184 A1 Aug. 14, 2008

(51) Int. Cl.
    *G01M 15/00* (2006.01)
(52) U.S. Cl. .................................. 73/114.04
(58) Field of Classification Search ............ 73/114.02, 73/114.03, 114.04, 114.05, 114.07, 114.08, 73/114.09, 114.11, 114.12
    See application file for complete search history.

(56) References Cited

U.S. PATENT DOCUMENTS

| 5,200,899 | A | * | 4/1993 | Ribbens et al. ............. 701/111 |
| 5,487,008 | A | | 1/1996 | Ribbens et al. |
| 5,495,415 | A | * | 2/1996 | Ribbens et al. ............. 701/111 |
| 5,576,963 | A | * | 11/1996 | Ribbens et al. ............. 701/111 |
| 6,263,727 | B1 | | 7/2001 | Butler, Jr. |
| 6,357,287 | B1 | | 3/2002 | Jin |
| 6,560,526 | B1 | | 5/2003 | Matekunas et al. |
| 6,651,490 | B1 | * | 11/2003 | Ceccarani et al. ........ 73/114.74 |
| 6,799,453 | B2 | | 10/2004 | Miyauchi et al. |
| 6,920,783 | B2 | | 7/2005 | Kesler |
| 7,299,687 | B2 | * | 11/2007 | Hernandez ............... 73/114.12 |

\* cited by examiner

*Primary Examiner*—Eric S McCall
(74) *Attorney, Agent, or Firm*—Paul L Marshall (57) ABSTRACT

A computer implemented system for engine misfire detection employs a crankshaft-originated speed signal that includes normal variability due to target wheel tooth error and the like. A Discrete Fourier Transform (DFT) is performed on the speed signal to convert it into a frequency-domain raw misfire detection metric. The system is configured to normalize the raw misfire detection metric using a non-misfire metric that is obtained by and corresponds to non-misfire operation of an internal combustion engine. A resulting normalized misfire detection metric has such normal variations removed leaving variations attributable to misfire. The system detects a misfire when the normalized misfire detection metric exceeds a predetermined threshold and is bounded by a predetermined phase angle region. The system detects both continuous misfire as well as intermittent misfire. The system also detects single cylinder misfire and multiple cylinder misfire.

19 Claims, 9 Drawing Sheets

FOURIER-BASED MISFIRE DETECTION STRATEGY

BACKGROUND OF THE INVENTION

1. Related Field

The present invention relates generally to misfire detection in an internal combustion engine, and more particularly to a Fourier-based misfire detection strategy.

2. Description of the Related Art

A misfire condition in an internal combustion engine results from either a lack of combustion of the air/fuel mixture, sometimes called a total misfire, or an instability during combustion, sometimes referred to as a partial misfire. In such case, torque production attributable to the misfiring cylinder decreases. Additionally, uncombusted fuel enters the exhaust system, which is undesirable. Because of the possible impact on the ability to meet certain emission requirements, including California Air Resource Board (CARB) emission-related requirements, engine misfire detection is needed.

Misfire detection is desired across the full speed and load operating region of a vehicle. Production algorithms have been developed and employed successfully on four and six cylinder engines since the mid-90s. In this regard, the basic strategy employed measures the period for each cylinder event (i.e., 180 degrees for a 4 cylinder and 120 degrees for a 6 cylinder) and detects misfire by monitoring the variation in the time periods. Through digital processing techniques, the reference periods can be compared against each other to determine if misfire occurred and in which cylinder(s). Even on these low number of cylinder engines (i.e., 4 and 6 cylinders), there is often the need to request exceptions from CARB due to the lack of detectability. Detectability issues can be caused by a variety of root sources. First, low load and high speed (or frequency) make detectability more difficult since the underlying misfire disturbance will have less impact on the mechanical crank system. Second, increasing the inertia of the driveline and lowering the cylinder contribution, as which occurs with higher number of cylinder engines, also compromises detectability. Engine resonance effects from crankshaft oscillations can also complicate detection. Finally, variations between different engines and the corresponding target wheels (i.e., used in producing the crankshaft-originated speed signal) also complicates detection.

Various approaches for misfire detection have been proposed in the art. For example, U.S. Pat. No. 5,487,008 entitled "METHOD AND SYSTEM FOR DETECTING THE MISFIRE OF A RECIPROCATING INTERNAL COMBUSTION ENGINE IN FREQUENCY DOMAIN" issued to Ribbens et al., disclose the use of a Discrete Fourier Transform (DFT) in the context of misfire detection. However, Ribbens et al. do not disclose strategies for effectively addressing the above-noted shortcomings in the art. Additionally, existing strategies in the art using frequency domain analysis to determine misfire have been known to use adaptive thresholds. However, such approaches still encounter the same shortcoming noted above.

There is therefore a need for a system and method to minimize or eliminate one or more of the problems as set forth above.

SUMMARY OF THE INVENTION

It is one object of the present invention to effectively discriminate a misfire from normal combustion, especially across wide ranges of engine speed and load, as well as for a higher number of cylinder engines than is conventional (e.g., eight cylinder engines).

In conventional misfire detection systems for reciprocating internal combustion engines of the type that use a crankshaft speed target wheel, variations in crankshaft speed due to tooth error and engine effects occur naturally (or are in other words inherent in the system). Although there are tooth errors, engine variations, etc., that create deviations in the crankshaft-originated speed signal, this condition may be considered "normal" (i.e., these deviations exist even in true non-misfire conditions). However, such "normal" variations can nonetheless obscure variations in speed due to misfire, which can prevent accurate detection of or in other words mask misfire conditions. Prior systems that assess only the amplitude/phase of the spectral components derived from the crankshaft-originated speed signal encounter difficulty in certain circumstances distinguishing non-misfire and misfire conditions.

According to the invention, it has been recognized that deviations from "normal" operation provide more insight into misfire than do absolute variations (e.g., as expressed in the unaltered inherent amplitude and phase of spectral components over the operating region).

The present invention includes a method for misfire detection in an internal combustion engine. The method includes several steps. The first step involves producing a first signal (e.g., a crankshaft angular speed signal) corresponding to rotational characteristics of an engine crankshaft taken at selected times. The first signal includes a measure of variability corresponding to characteristics unique to the internal combustion engine system. For example only, where a target wheel is used to produce the first signal, the measure of variability may include tooth error. Additionally, variability due to engine and/or driveline uniqueness is also recognized. It is contemplated that this variability is "normal" insofar as it exists in the true non-misfire operation of the internal combustion engine. Misfire may contribute its own variation to the speed signal.

The next step involves converting the first signal (e.g., the speed signal) into a frequency-domain misfire detection metric having components selected from an engine cycle frequency and harmonic orders thereof. In a preferred embodiment, this converting step may include the sub-step of performing a Discrete Fourier Transform (DFT). The next step involves normalizing the misfire detection metric using a non-misfire metric corresponding to non-misfire operation of the internal combustion engine. The normalizing step is configured to remove the "normal" measure of variability described above. The final step involves detecting a misfire condition when the normalized misfire detection metric exceeds a predetermined threshold and identify the origin of the misfire (i.e., the individual cylinder or multiple cylinder) by considering the phase of the misfire detection metric.

One advantage of the present invention is that it provides for accurate and effective misfire detection across a broad range of engine speed and load, as well as with internal combustion engines with a higher number of cylinders.

BRIEF DESCRIPTION OF THE DRAWINGS

The present invention will now be described, by way of example, with reference to the accompanying drawings, wherein like reference numerals identify identical components in the several figures, in which.

DETAILED DESCRIPTION OF THE PREFERRED EMBODIMENTS

Figure 1:
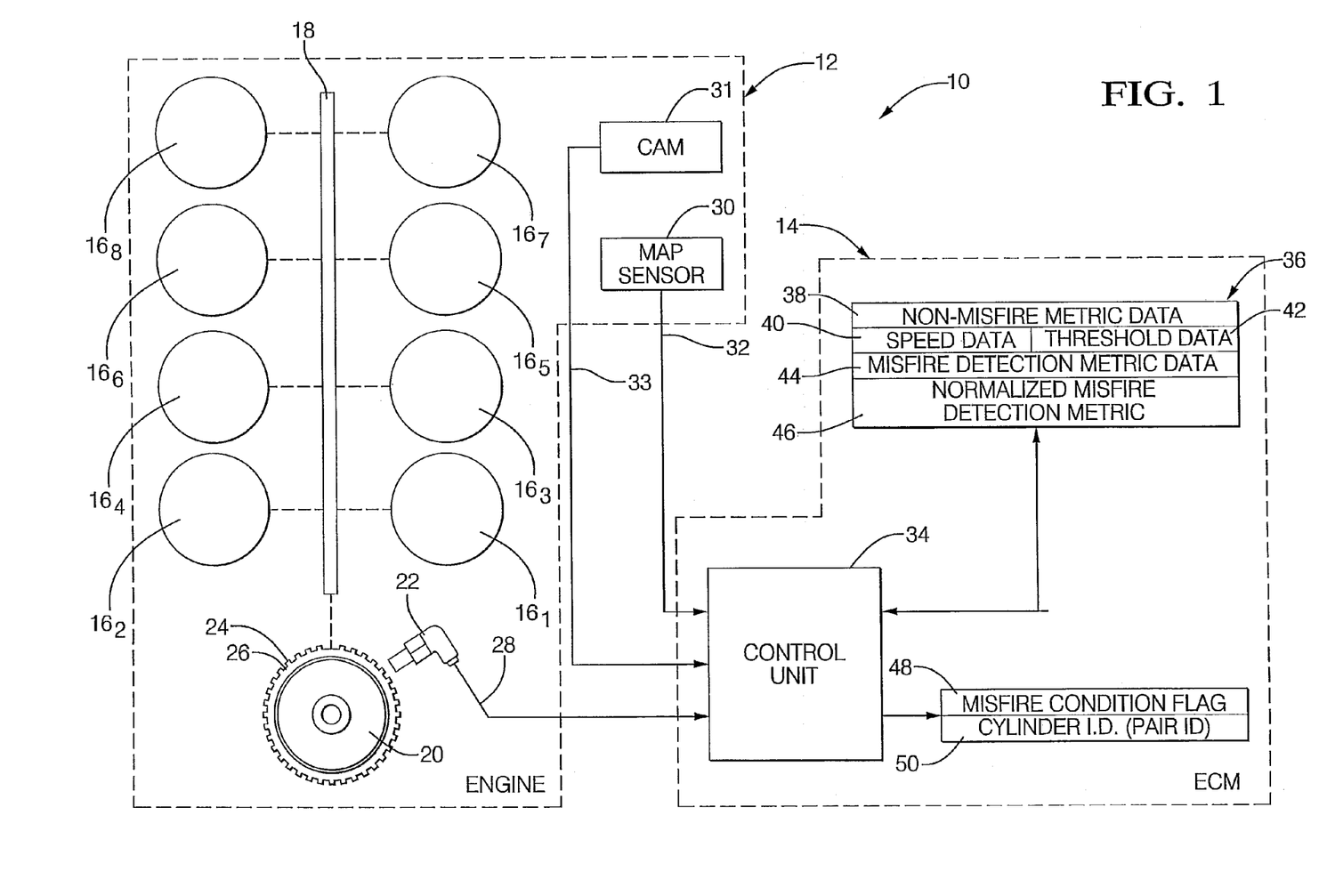
FIG. 1 is a simplified diagrammatic and block diagram view of a misfire detection system in accordance with the present invention.

Referring now to the drawings wherein like reference numerals are used to identify identical components, FIG. 1 shows an internal combustion engine system 10 including an internal combustion engine 12 whose operation is controlled by a programmed, electronic engine control module (ECM) 14 or the like, as known generally in the art. System 10 is configured, as will be described and illustrated hereinafter, to provide improved misfire detection as to either an individual cylinder or multiple cylinder (e.g., a cylinder pair). System 10 includes improved discrimination capability that provides for more effective detection for higher number cylinder engines as well as over greater engine speed/load ranges. System 10 generally employs frequency domain, Fourier techniques to evaluate the spectral content of a crankshaft-originated speed signal. Speed fluctuations due to misfire result in certain harmonics being present in the frequency domain transformation of the crankshaft-originated speed signal. The present invention provides methods and systems to effectively separate harmonics which are indicative of misfire, as opposed to harmonics that are due to tooth error, engine variability and other influences that are not indicative of a misfire. Accordingly, the accuracy and confidence of misfire detection is improved.

With continued reference to FIG. 1, engine 12 includes a plurality of cylinders, illustrated in exemplary fashion as a V-type, 8 cylinder engine where the cylinders are designated $16_1, 16_2, 16_3, \ldots, 16_8$. In one arrangement, for example, the firing order may be designated as cylinders 1-8-7-2-6-5-4-3. Of course, other numbering schemes and/or firing orders are possible, as known in the art. Moreover, the present invention is not limited to any particular number of cylinders, i.e., an eight cylinder engine as shown is exemplary only.

The basic arrangement of engine 12 is known in the art, and will not be repeated exhaustively herein in detail. However, it should be understood that each cylinder $16_1, 16_2, 16_3, \ldots, 16_8$ is equipped with a corresponding piston (not shown), which is connected to a common crankshaft 18, as shown by the dashed-line in FIG. 1. As known, the crankshaft 18 is coupled to a powertrain (e.g., transmission and other drivetrain components—not shown) in order to provide power to a vehicle (not shown) for movement. Controlled firing of the cylinders causes the various pistons to reciprocate in their respective cylinders, causing the crankshaft to rotate. There is a known relationship between the angular position of the crankshaft 18, and each of the pistons. Each piston, as it reciprocates, moves through various positions in its cylinder, and any particular position is typically expressed as a crankshaft angle with respect to top-dead-center position. In the well-known 4 stroke engine (intake-compression-power-exhaust), two full revolutions (720 degrees) of the crankshaft 18 occur to complete one engine cycle.

In this regard, FIG. 1 further shows a target wheel 20 and a corresponding sensor 22. Target wheel 20 is configured for rotation with crankshaft 18. Target wheel 20 includes a plurality of radially-outwardly projecting teeth 24 separated by intervening slots 26. Target wheel 20 and sensor 22 are, in combination, configured to provided an output signal 28 that is indicative of the angular position of crankshaft 18. Output signal 28, as described below, may be used to derive a speed indicative signal.

One objective of the invention is to improve the detectability of misfire and thus it is necessary to process additional information over the cylinder firing event. As described in the Background, it is known to measure a time variation in the firing event period (720°/# cylinders) to determine if misfire occurred. Early systems used 2×, 3× and 4× target wheels for 4, 6, and 8 cylinder engines respectively. In recent years, higher count target wheels are more commonly employed on engines, with one common variant being the 58× (i.e., 60−2; 58 teeth spaced around the wheel, spaced as though there were 60 evenly spaced teeth but with two teeth missing). In the illustrated embodiment, target wheel 20 may be the 58× form target wheel known in the art. This form of a target wheel 20 provides a rising edge in the output signal every 6 degrees, with the exception of the 2 tooth gap, which as known is used as a reference. A speed-based signal can be formed by determining the speed, or a representative signal, every 6 degrees or multiples of 6 degrees as typically only one edge is used.

FIG. 1 further shows an engine load indicative sensor such as an intake manifold absolute pressure (MAP) sensor 30, and a camshaft position sensor (CAM) 31. The MAP sensor 30 is configured to produce an output signal 32 indicative of manifold absolute pressure. The output signal 32 is indicative of engine load. It should be understood that other signals may be used as a proxy for load, including but not limited to a mass air flow (MAF) signal or a throttle position signal. The CAM sensor 31 is configured to generate a CAM signal 33 that is indicative of which rotation of the engine cycle the crankshaft is on. That is, the crankshaft sensor output signal 28 alone is insufficient to determine whether the crankshaft is on the first 360 degree rotation or on the second 360 degree rotation, which would together define an engine cycle for a four-stroke engine.

With continued reference to FIG. 1, ECM 14 may include a control unit 34 that is characterized by general computing capability, memory storage, input/output (interface) capabilities and the like, all as known in the art. ECM 14 is configured generally to receive a plurality of input signals representing various operating parameters associated with engine 12, with three such inputs being shown, namely, crankshaft sensor output signal 28, MAP output signal 32 and CAM signal 33. ECM 14 is configured with various control strategies for producing needed output signals, such as fuel delivery control signals (for fuel injectors—not shown), all in order to control the combustion events, as well as spark timing signals (for respective spark plugs—not shown). In this regard, ECM 14 may be programmed in accordance with conventional, known air/fuel control strategies and spark timing strategies.

In accordance with the present invention, control unit 34 of ECM 14 is further configured to perform the misfire detection methodology as further described herein. It should be understood that the functional and other descriptions and accompanying illustrations contained herein will enable one of ordinary skill in the art to practice the inventive misfire detection inventions without undue experimentation. It is contemplated that the invention will preferably be practiced through programmed operation (i.e., execution of software computer programs) of control unit 34. As used herein, the various metrics, thresholds, and the like may be viewed as electronic signals although embodied in software as stored values.

Misfire Detection

Before proceeding to a detailed description of the present invention, further description as to context will be set forth. In order to form a more sensitive algorithm that will achieve the objects of the invention, it is initially contemplated that it is possible to use Fourier techniques to evaluate the spectral content of a crank related signal. Options for processing include, speed and acceleration as well as related scaled metrics. The basic speed equation, designated equation (1), that can be used in an embodiment of the invention is as follows:

$$\omega(\theta) = \frac{\Delta\theta}{\Delta T} \quad (1)$$

Processing already available in conventional implementations of control unit 34 will make a speed reading or the like available at set angular position increments dictated by the tooth spacing of the target wheel 20. In the illustrated embodiment, the fixed, angular position sampling is advantageous since it allows the harmonic content to be determined based on orders of rotation, which are independent of the crankshaft average speed. It should be understood, however, that non-fixed (non-uniform) intervals may be used in accordance with the invention, albeit with increased processing requirements. In one embodiment, timestamps are recorded at each tooth interval of target wheel 20 (i.e., an edge is available every six degrees, for example, with a (58+2) target wheel), and maintained in memory associated with control unit 34. This fixed angle sampling provides the raw data necessary to derive a plurality of different parameters associated with the rotation of crankshaft (as a function of time). As noted above, a speed signal may be derived and used in accordance with the present invention.

Control unit 34 is thus programmed to employ digital processing techniques, particularly those configured to convert time-domain data to frequency domain data in order to analyze the spectral components associated with the crankshaft rotation.

In this regard, in a preferred embodiment, a Discrete Fourier Transform (DFT) is programmed in control unit 34, and whose basic equations are as set forth below in equations (2) and (3):

$$a(k) = \frac{1}{N}\sum_{n=0}^{N-1} x(n)e^{-jk\frac{2\pi}{N}n} \quad (2)$$

$$x(n) = \sum_{n=0}^{N-1} a(k)e^{jk\frac{2\pi}{N}n} \quad (3)$$

where x(n) is the speed waveform in the sampled-angle domain, a(k) is the result of the DFT, which is a complex number that indicates magnitude and phase for the $k^{th}$ harmonic order, and N is the total number of points of the DFT. The variables n and k represent the nth speed point and the $k^{th}$ harmonic of the computation respectively. That is, the result of the DFT, as described in greater detail below for a constructed embodiment, includes as an initial matter both a real component and an imaginary component (i.e., the complex quantity referred to above). This in conventional parlance may be plotted on a rectangular coordinate system, with the real component on the "x" axis and the imaginary component on the "y" axis. This complex quantity may be equivalently represented as a magnitude and a corresponding phase, through well known relationships. Additionally, as used herein, reference to "order" or "harmonic order" refers to the order in the DFT output (i.e., the variable k in equations (2) and (3) above). The relationship of the harmonic order to the engine cycle frequency is dependent on the length of the period of the DFT. If the DFT period is taken across one engine cycle, then the first order would relate to the engine cycle frequency and the $2^{nd}$ order would relate to the rotational frequency. If a longer period, such as 2 engine cycles, is chosen then the first order would now relate to ½ the engine cycle frequency.

FIG. 1 further shows control unit 34 being coupled to a data structure 36 or the like configured to store a variety of data employed in carrying out the present invention. It should be understood that some of the data is determined and stored in advance of the performance of the present invention, while other data is calculated during the performance of the inventive method and stored temporarily. Data structure 36 may be implemented in a separate memory from control unit 34 or may be implemented in memory that is integral therewith. In this regard, FIG. 1 further shows non-misfire metric data 38, speed data 40, threshold data 42, misfire detection metric 44 and normalized misfire detection metric data 46. Each of these will be described generally immediately below with further elaboration throughout the remaining specification.

The term metric as used in this specification refers to either the output of a calculation or as a quantity used in determining another quantity, which may in some instances comprise a complex quantity that includes a real part and an imaginary part. The non-misfire metric 38 for example refers to complex quantities, for one or more orders of interest, that is stored in data structure 36, which characterizes the "normal" or non-misfire operation of internal combustion engine system 10. In this regard, the non-misfire metric 38 inherently reflects variations that exist due to tooth errors (from target wheel 20), engine variations as well as any other variations that exist other than variations due to misfire. The non-misfire metric 38, in one embodiment, may be defined for a range of engine speed and load (e.g., MAP) values.

Speed data 40 comprises, in one embodiment, an array of timestamp information corresponding to the known, angular positions of crankshaft 18 generated by way of information produced by target wheel 20 and sensor 22 during rotation. Speed data 40 may further comprise derivations of this information, in the form of a speed and/or acceleration signals, for example, as described above in equation (1).

Threshold data 42 comprises data values organized as a function of (and throughout which are valued) engine speed and load (MAP). Threshold data 42 may be further broken down into categories: (1) single or individual cylinder misfire threshold data; (2) multiple cylinder misfire threshold data; and (3) single or individual cylinder (phase) identification threshold data; and (4) multiple cylinder (phase) identification threshold data. The term multiple cylinder misfire is used throughout this specification, and is meant to refer to at least one of adjacent pair cylinder misfire, opposed pair cylinder misfire, and at least two cylinders misfiring. The use of threshold data 42 will be described in greater detail below.

Misfire detection metric data 44 refers to complex quantities, for one or more orders of interest, that are stored in data structure 36 which characterize the real-time operation of internal combustion engine system 10 under inspection. In this regard, the misfire detection metric 44 inherently reflects both (1) variations that exist due to tooth errors (from target wheel 20), engine variations as well as any other variations that exist other than variations due to misfire; and (2) variations that may exist due to cylinder misfire. It should also be understood that misfire detection metric 44 is a generic term used to refer to at least two different metrics: (1) single cylinder misfire detection metric and (2) multiple cylinder misfire detection metric. The applications of these metrics will be set forth in greater detail below.

The normalized misfire detection metric 46 refers to a quantity resulting from the processing of two metrics: (1) the misfire detection metric 44 (real time measurement); and (2) the non-misfire metric 38 (typically determined in advance). In one embodiment, the process to obtain the normalized misfire detection metric 46 involves subtracting the non-misfire metric from the misfire detection metric, both complex quantities, on an order-by-order basis, calculating a respective magnitude and then summing the individual magnitudes. The normalized misfire detection metric 46, after it is determined, is then evaluated relative to certain components of threshold data 42 in order to arrive at a determination of whether a misfire has occurred, and if so, in what individual cylinder (or what multiple cylinders).

Control unit 34 is further configured to produce an output signal indicative of whether a misfire occurred, such as for example an internal misfire condition flag 48. Additionally, control unit 34 may be still further configured to generate an output signal identifying the single cylinder that misfired, or what multiple cylinders (e.g., cylinder pair) that misfired, such as by a cylinder identification flag 50. It should be understood that control unit 34 may be configured to produce these flags as externally available electrical signals, and that such signals would fall within the spirit and scope of the present invention.

In the case of continuous misfire detection, it is advantageous to consider an evaluation period (hereafter sometimes referred to as the "sampling interval") that is an integer multiple of the 720 degrees (i.e., two revolutions of the crankshaft 18 corresponding to an engine cycle period for a four-stroke engine). When this is done, the presence of a misfire can be determined by which orders of the engine cycle period differ between normal and misfire events. In addition, the phase of the DFT will indicate which specific cylinder or multiple cylinders misfired. In the simplest cases, misfire can be expected to occur at relatively low orders and have significant spectral content at the engine cycle frequency for single cylinder misfire and at 2× the engine cycle frequency for opposed pair misfire.

It should be understood that the present invention, while described in the context of a preferred, four stroke engine embodiment, is equally applicable to two stroke engine embodiments.

Figure 2:
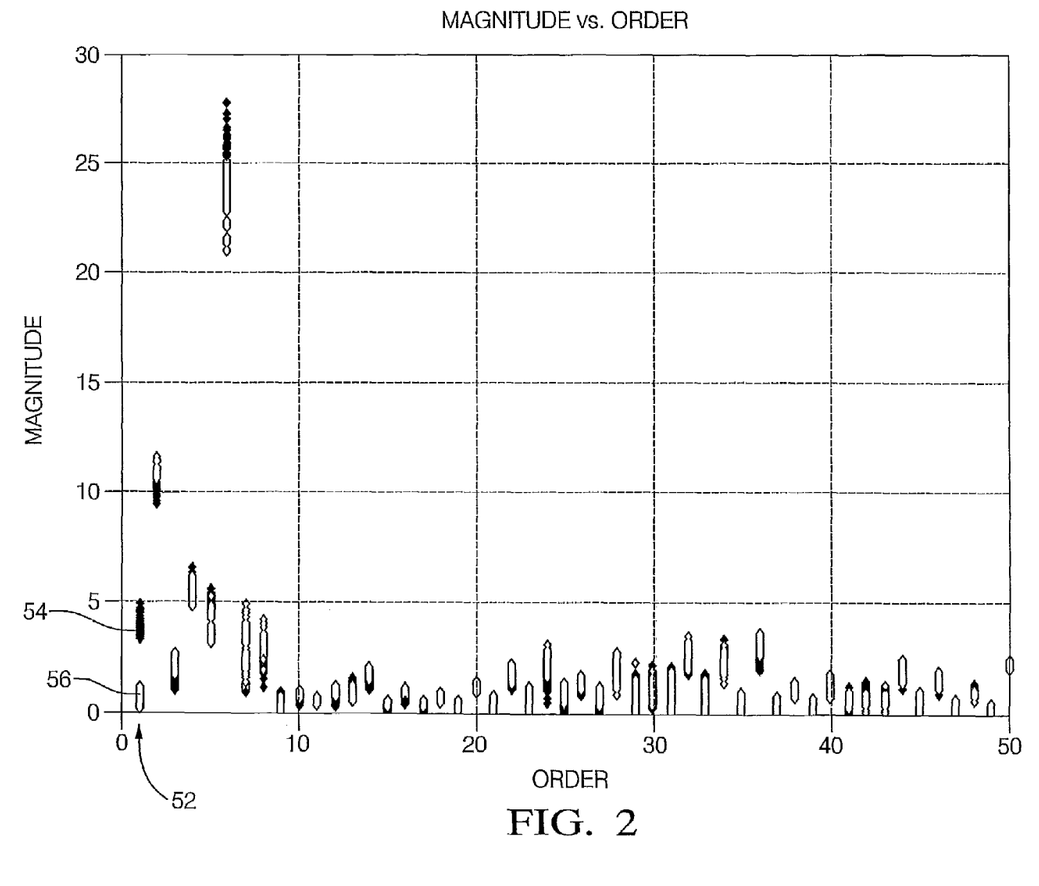
FIGS. 2 and 3 are magnitude and phase versus harmonic order diagrams illustrating distinctions between a "normal," non-misfire condition and a misfire condition.
Figure 3:
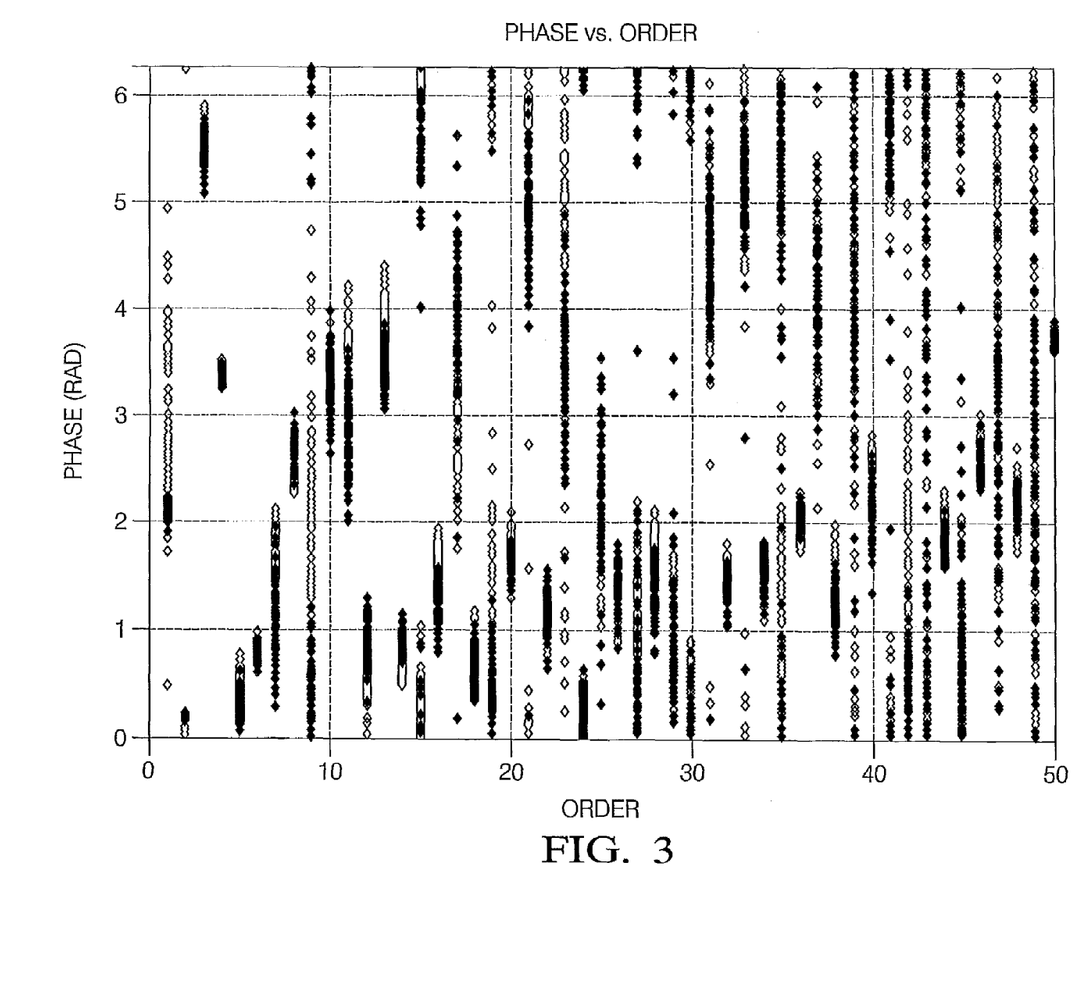

FIGS. 2 and 3 are respective magnitude and phase (versus order) diagrams for a specific speed, load and continuous misfire case for 100 engine cycles on a General Motors V-8 5.3 L internal combustion engine. In a general sense, and subject to further refinements set forth below, the magnitude and phase define a raw, unprocessed misfire detection metric. This is the complex quantity used to evaluate whether misfire has occurred. These charts relate to normal and cylinder 3 misfire of such engine, running at an engine speed of 4000 rpm, with a load corresponding to 35 kPA (MAP). Each diagram compares, on a per-order basis, the relative magnitudes and phases for a "normal" (non-misfire) condition versus a cylinder 3 misfire condition.

In general, the light areas represent normal, non-misfire operation and the black areas represent misfire cases. Taking the first order as exemplary (designated 52), note the distinction between misfire (designated 54) and non-misfire (designated 56). From FIGS. 2 and 3, it is clear that the two cases do differ, with the greatest difference being expressed in the first ten orders. Also, the phase for the specific cylinder misfire is concentrated to a narrow band for the $1^{st}$ order. Based on this information, misfire can be detected by amplitude of the order(s) and the specific cylinder can be determined by considering the phase.

Figure 4:
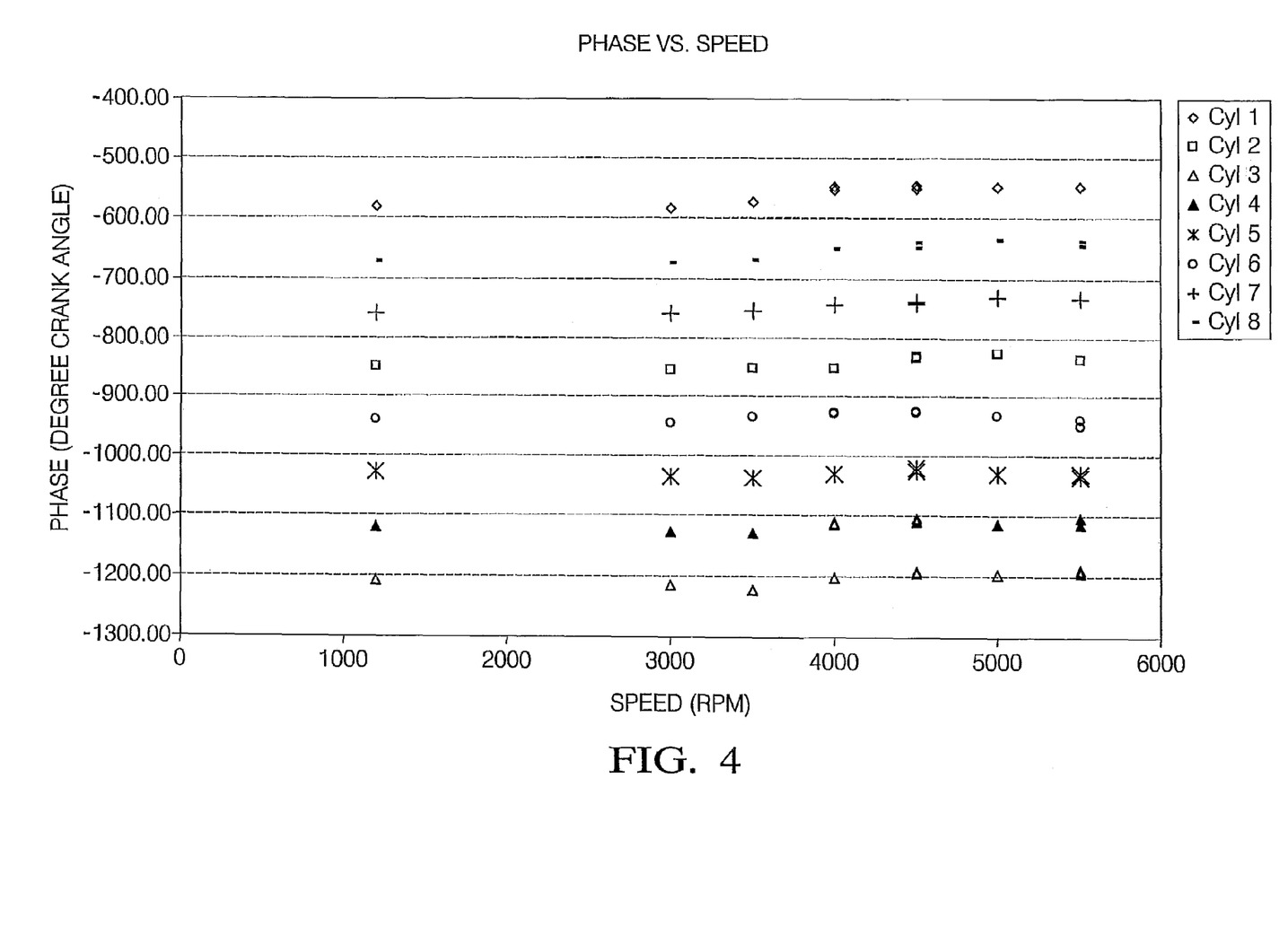
FIG. 4 is a phase versus speed diagram illustrating phase-based cylinder identification for a single cylinder misfire condition.
Figure 5:
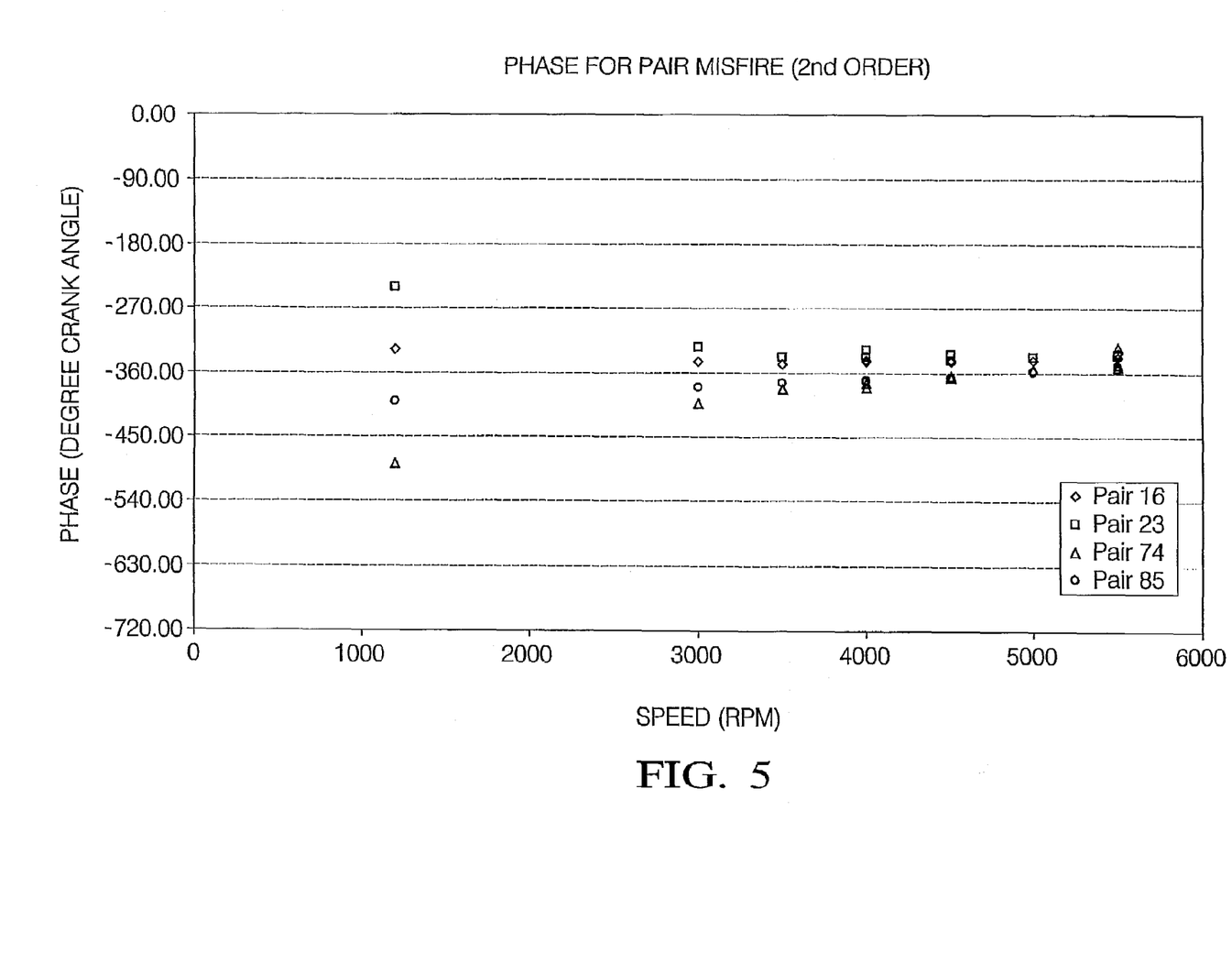
FIG. 5 is a phase versus speed diagram illustrating difficulties using conventional phase-based identification for multiple cylinder (e.g., cylinder pair) misfire conditions.

FIGS. 4 and 5 are phase versus engine speed diagrams for single cylinder and the specific case of opposed pair cylinder misfires (meaning 1 cylinder per rotation phased 360 degrees apart misfires), respectively. Conventional approaches have sought to use the phase information to identify the cylinder(s) causing the misfire condition. As alluded to above, the phase of key misfire harmonics relates to which cylinder(s) caused the misfire. FIGS. 4 and 5 show the impact of using the $1^{st}$ order for single cylinder and the $2^{nd}$ order for opposed pair cylinder identification for the exemplary GM 5.3 L V-8 engine.

As shown in FIG. 4, for the case of a single cylinder misfire, the impact of the misfire is sufficiently distinct to allow it to be related to which cylinder caused it despite variations in speed and load. The angular spacing is 90 degrees, as would be expected, and the order is consistent with the firing order of the engine.

FIG. 5 illustrates the phase versus speed relationship for the opposed pair cylinder misfire scenario. It can be seen that the degree of discrimination, and thus the ability to make an accurate identification of the cylinder pair involved in a pair misfire scenario, suffers greatly as the speed is increased, due to the fact that the engine has a natural $2^{nd}$ order effect that increases with speed, which swamps the impact of misfire itself.

Thus, the basic challenge is how to improve conventional Fourier approaches for misfire detection while still having a result that can be practically implemented. The first step is to improve the detectability of misfire by improving the discrimination capability. The first step for continuous misfire is to use a longer period for the DFT algorithm in order to better isolate the misfire related spectral content.

Figure 6:
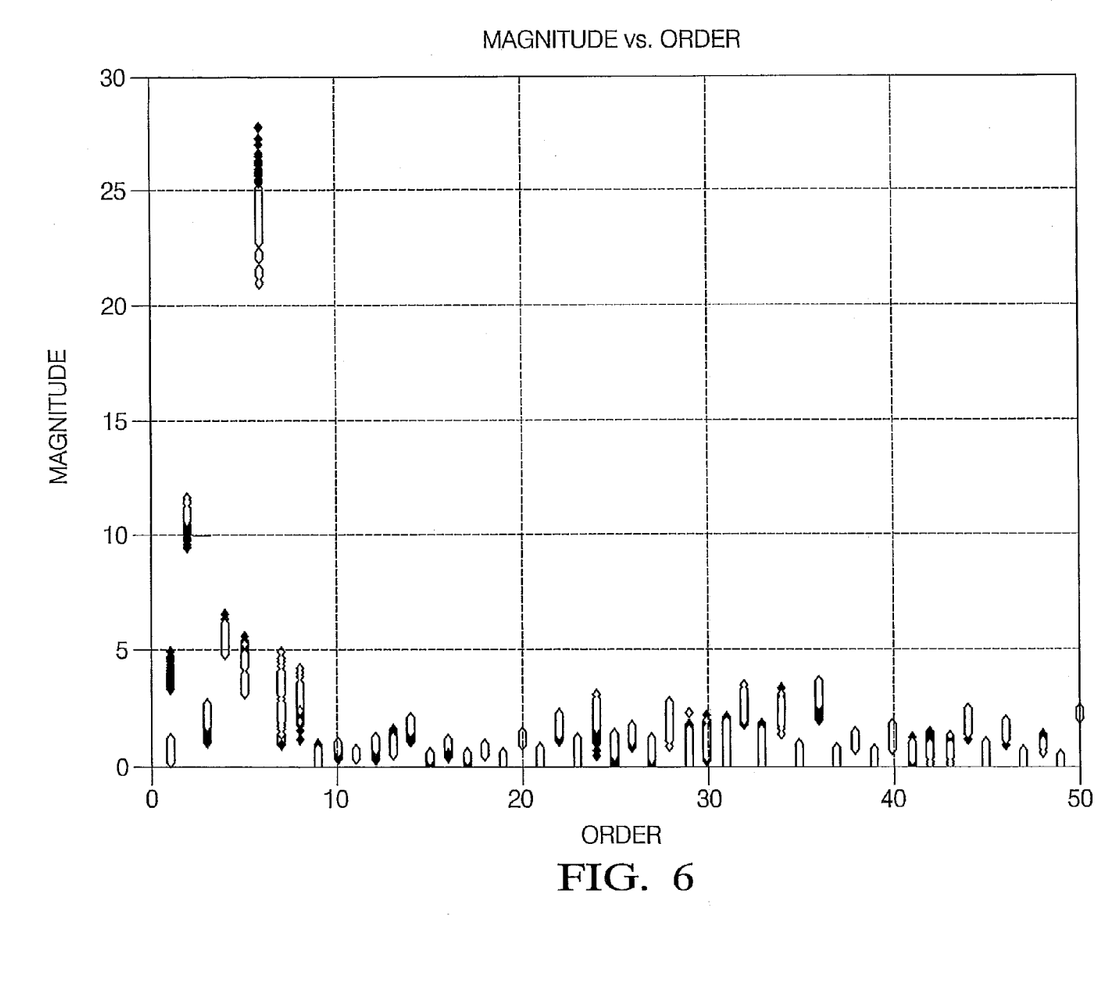
FIGS. 6 and 7 are magnitude versus harmonic order diagrams illustrating the effect of expanding the sampling interval from one engine cycle (FIG. 6) to three engine cycles (FIG. 7).
Figure 7:
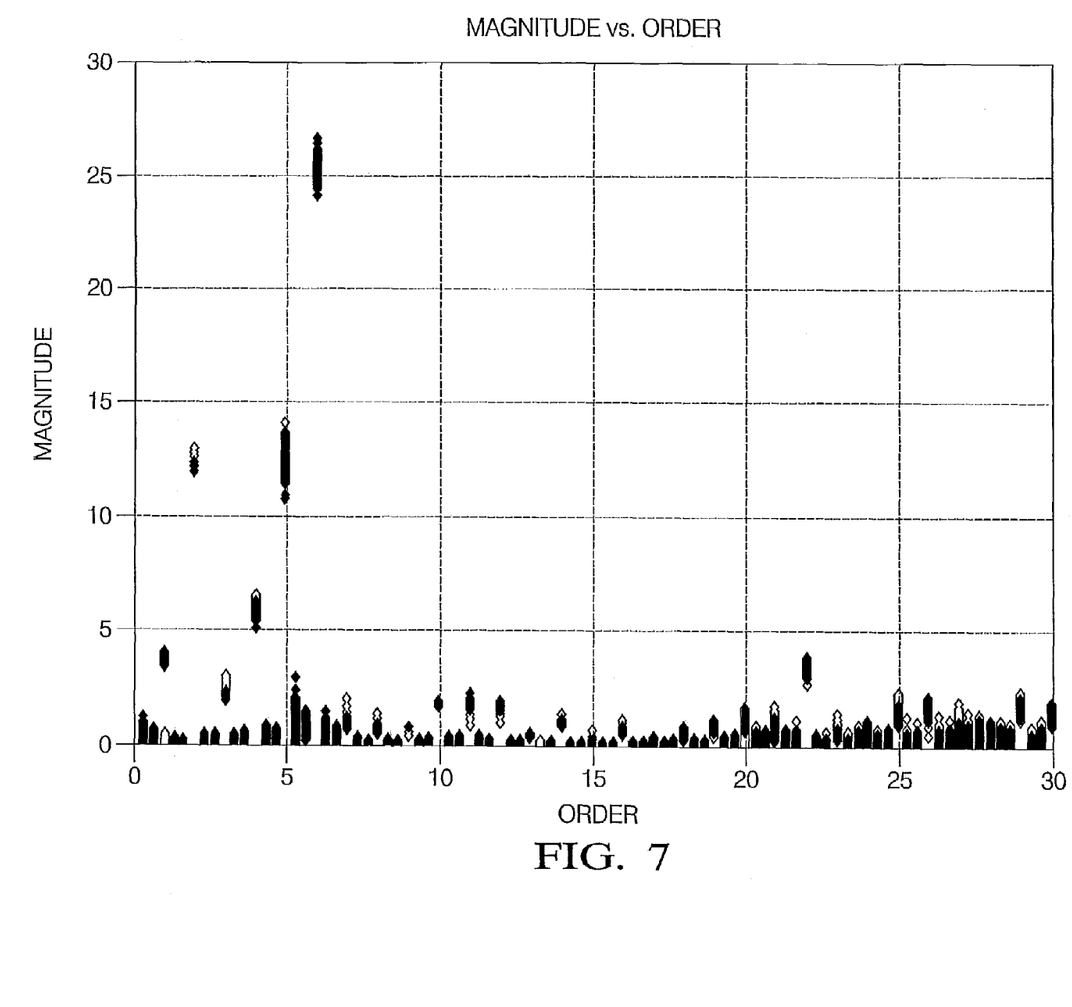

FIGS. 6 and 7 compare the differences of employing a sampling interval for the DFT over one engine cycle (FIG. 6) versus over three engine cycles (FIG. 7). From the FIGS. 6 and 7, it is clear that greater periods can be beneficial in terms of reducing the noise and creating a clearer distinction between normal and misfire events. Again, the light areas are normal, non-misfire events while the dark areas are misfire events.

As can be seen from FIGS. 6 and 7, particularly FIG. 7, the difference between normal events and misfire events can be observed in several orders and it may be desirable to combine the effect of these orders. As the result of the DFT contains both magnitude and phase, a metric that uses both components can be found to improve the detection capability of the inventive process.

In accordance with the invention, a new metric is used for detecting misfire that seeks to remove the normal variability that inherently exists, leaving just variability that may exist due to engine misfire. This is known herein as a normalized misfire detection metric. Several normalized approaches were considered for normalizing the raw misfire detection metric. In a preferred embodiment, the normalized misfire detection metric 46 is as follows in equation (4):

Normalized Misfire Detection Metric 46=$(|a_1 - \overline{a}_{1\_n}|)+(|a_2 - \overline{a}_{2\_n}|)+ \ldots +(|a_p - \overline{a}_{p\_n}|)$ (4)

where the $a_x$ term represents the complex harmonic value from the DFT, or in other words, the misfire detection metric 44, while the $\overline{a}_{1_n}$ term represents the normal (non-misfire) average complex value for the harmonic of interest, or in other words, the non-misfire metric 38. Equation (4) may be referred to herein alternatively as the Sum of the Complex Magnitudes.

Note that a constituent component of a suitable metric to detect misfire will implement the concept of having a measure of what the "normal" characteristics are. The basis for wanting to find the variation from "normal" allows for a basic threshold test to be used. Furthermore, the concept of "normal" accounts for engine and target wheel variation, among other characteristics unique to a particular engine system 10. The timing of when to define the "normal" metric (e.g., non-misfire metric 38) may occur before or during run time operation of a vehicle, and, for example, may be based on either a coast down test or a guaranteed misfire free condition. In some embodiments, it may be sufficient to learn engine variation on a test engine platform and only, if required, learn the target wheel in the application (i.e., during real-time operation). Furthermore, only key harmonics must be normalized since the algorithm referred to in equation (4) may optionally not require use of the full DFT results.

As described above, the phase algorithm (e.g., FIG. 5) typically used for Fourier misfire detection is inadequate in some cases for identifying the cylinder pair which misfired. For these cases, it is necessary to consider the phase of the complex vector difference between normal and misfire. This is inherently part of the Sum of Complex Magnitudes algorithm (i.e., may use an intermediate calculation made during the evaluation of equation (4), from which a phase is calculated). When this algorithm is considered the cylinder identification becomes more distinct as is seen in FIG. 8.

Figure 8:
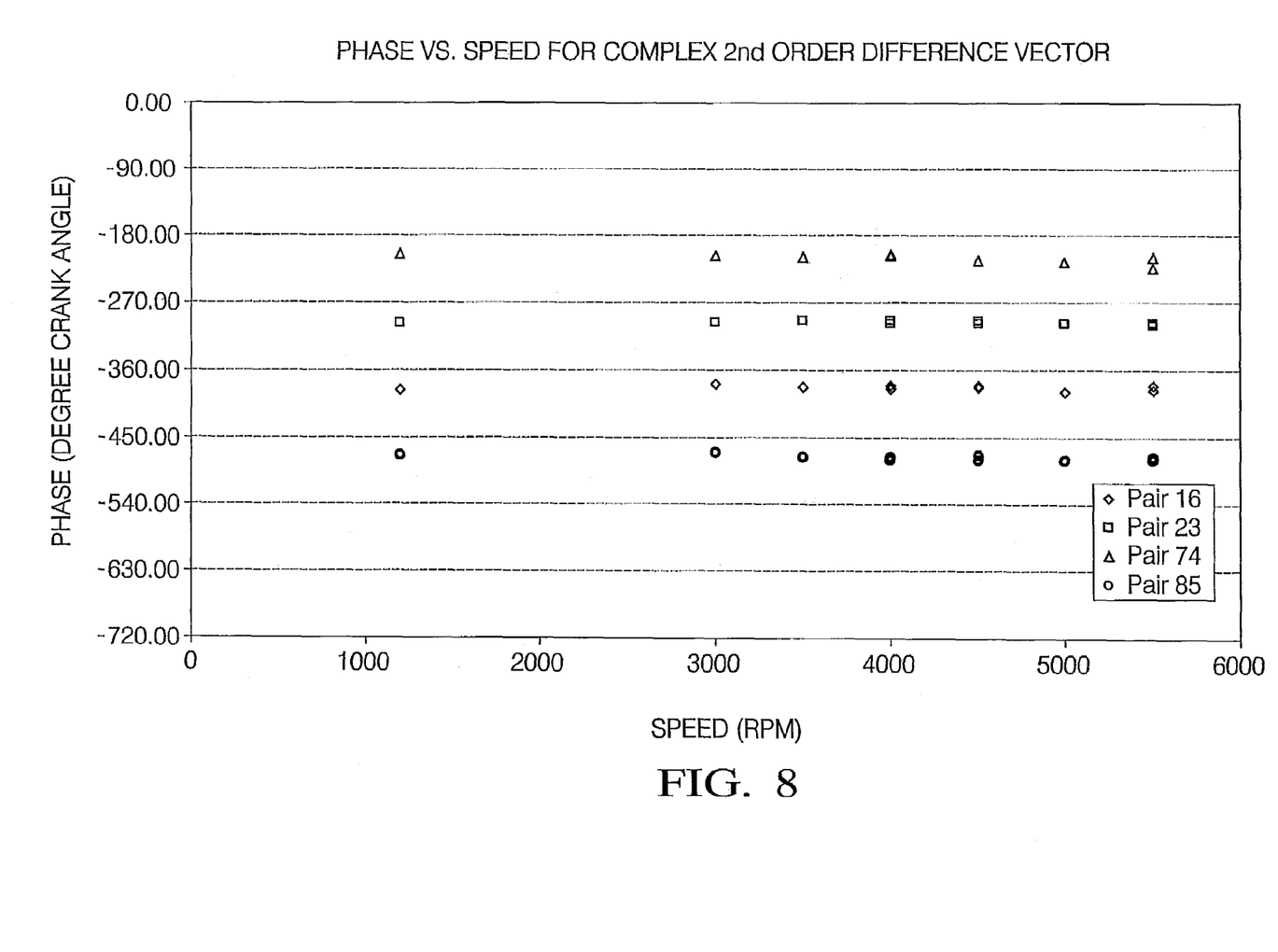
FIG. 8 is a phase versus speed diagram illustrating the use of a modified phase-based identification for multiple cylinder (e.g., cylinder pair) misfire conditions.

FIG. 8 is a graph showing phase versus speed for a complex second order difference vector. As can be seen in FIG. 8, which shows the opposed pair misfire identification based on the phase of the $2^{nd}$ Order sub-component of the Sum of Complex Magnitudes Metric (equation (4)), the cylinder pair identification is now substantially easier. This is due to the effect of the $2^{nd}$ order crankshaft effect being removed from the complex vector quantity.

Work has been done that indicates that only a limited number of teeth of the 58× wheel are needed and judicious selection of the teeth used can avoid having to deal with gap-filling equations. Samples at 20× per crankshaft rotation were found to be adequate for misfire detection since only the low order harmonics were of interest.

Continuous Misfire Detection Method

Figure 9:
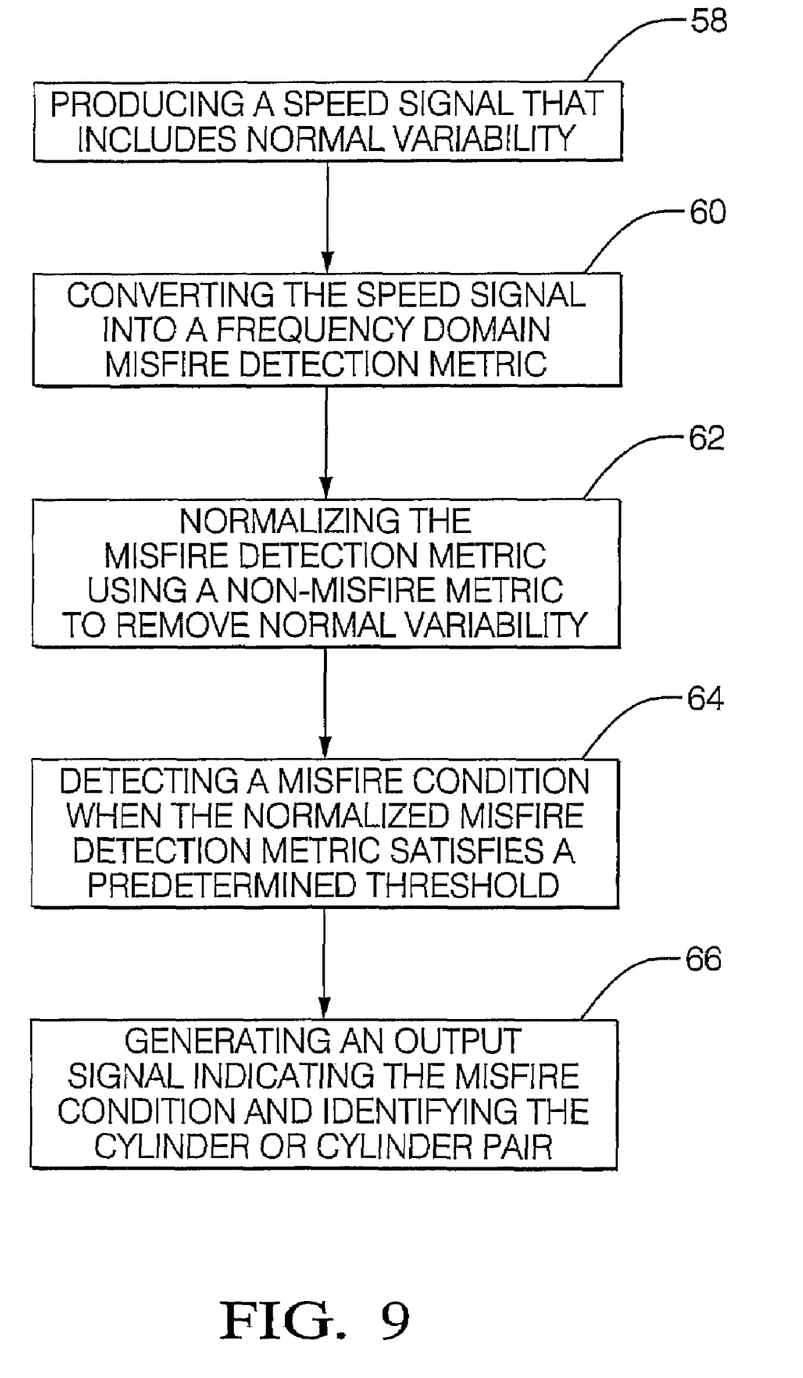
FIG. 9 is a simplified flow chart diagram illustrating the method for detecting misfire of the present invention.

FIG. 9 is a simplified flow chart of the method of the present invention. One embodiment is a continuous misfire detection embodiment and will be described immediately below. An alternate embodiment is a random/low level misfire embodiment and will be described thereafter. The method in FIG. 9 is repeatedly evaluated over a preselected evaluation window. In one embodiment, the preselected evaluation window is defined as two engine cycles. Accordingly, the methodology to be described in connection with FIG. 9 is to be repeated every two engine cycles (i.e., 4× crankshaft rotations), either as a batch or incremental task under the execution of control unit 34. The method begins with step 58.

Step 58 involves producing a speed signal. The speed signal preferably corresponds to an angular speed of the engine crankshaft 18 taken at selected times. The speed signal includes a measure of variability corresponding to characteristics unique to the internal combustion engine system 10. For example, such measure of variability may include speed variations due to tooth error, engine variability, etc. The speed signal may or may not include variability due to cylinder misfire.

Step 58 may include the sub-step of defining a sampling interval during which the speed signal is determined. In a continuous misfire detection embodiment, the speed signal is determined over two engine cycles.

From the timestamp information stored in speed data 40 a speed signal is derived for each tooth over the period defined. In one embodiment, the speed signal (in RPM) is preferred, and is defined as follows in equation (5). The parameter $K_{scaling}$ is selected to translate the unique engine system 10 particulars into revolutions per minute (RPM).

$$\omega(\theta) = \frac{\Delta\theta}{T_2 - T_1} K_{scaling} \quad (5)$$

The method then proceeds to step 60. Step 60 involves converting the speed signal into a frequency domain (unprocessed, raw) misfire detection metric having components selected from an engine cycle frequency and harmonic orders thereof. Converting step 60 may further include the step of selecting one or more harmonic order(s). For example, based on the speed and load point (MAP), the method is configured to select which engine orders should be used for evaluating and detecting misfire. Generally speaking, the engine orders that relate to misfire should be the engine cycle order for single cylinder misfire, and the engine rotation order for cylinder pair misfire. There may be other orders that contain useful information depending on the engine and operating point.

Converting step 60 may be performed by the sub-step of performing a Discrete Fourier Transform (DFT) for each harmonic order previously selected to be of interest (e.g., based on speed and load, engine type, etc.). Equation (6) may be used to perform the DFT:

$$a_k = \frac{1}{N}\sum_{n=0}^{N-1} x(n) e^{-jk\frac{2\pi}{N}n} \quad (6)$$

where $a_k$ is the amplitude of the DFT at the $k^{th}$ harmonic. The term $a_k$ is the non-normalized (raw) misfire detection metric 44, which is a complex quantity having real and imaginary parts thereof, as shown in equation (7):

$$a_k = \frac{1}{N}\sum_{n=0}^{N-1} x(n)\cdot\cos\left(k\frac{2\pi}{N}n\right) - j\frac{1}{N}\sum_{n=0}^{N-1} x(n)\cdot\sin\left(k\frac{2\pi}{N}n\right) \quad (7)$$

The real and imaginary parts of equation (7) are identified in equations (8) and (9) respectively:

$$a_{k\_real} = \frac{1}{N}\sum_{n=0}^{N-1} x(n)\cdot\cos\left(k\frac{2\pi}{N}n\right) \quad (8)$$

$$a_{k\_imag} = -\frac{1}{N}\sum_{n=0}^{N-1} x(n)\cdot\sin\left(k\frac{2\pi}{N}n\right) \quad (9)$$

For the GM engine described above, two engine cycles were selected (i.e., as the repeating evaluation window). In this regard, the number of samples used was N=80 points, spread out over 1440° of crankshaft rotation (e.g., 4 revolutions, 2 engine cycles). Two different misfire detection metrics 46 are contemplated in accordance with one embodiment of the present invention, with one order each. For this embodiment, for a single cylinder misfire detection metric, the selected order is k=2 or $2^{nd}$ order (engine cycle frequency), while for a cylinder pair misfire detection metric, the selected order is k=4 or $4^{th}$ order (rotational frequency). For reference, the mean value or $0^{th}$ order corresponds to k=0. As indicated above, since the main evaluation window was selected to be two engine cycles, these foregoing calculations are made every two engine cycles. It should be understood that if the evaluation window were only one engine cycle, then the fundamental (k=1) and the $2^{nd}$ harmonic (k=2) would be used. The method then proceeds to step 62.

Step 62 involves normalizing the raw misfire detection metric 44 (each one of a plurality of misfire detection metrics to the extent multiple metrics are used). The normalizing step 62 uses the non-misfire metric 38, which corresponds to a non-misfire operating condition of the internal combustion engine system 10. The effect of the normalizing step 62 is to obtain a normalized misfire detection metric 46 that has removed (or substantially removed) the normal measure of variability existent in the speed signal found in "normal" operation (i.e., without misfire).

Normalizing step 62 may further include the sub-step of retrieving from data structure 36 a suitable values for the non-misfire metric 38 based on engine speed and load. As indicated above, non-misfire metric 38 is a complex quantity including both real and imaginary components. In one embodiment, the data for the non-misfire metric 38 reflects the arithmetic mean values for that particular engine speed and load. In another embodiment, the data for the non-misfire metric 38 reflects the arithmetic average values for that particular engine speed and load. Other variations are possible, and remain within the spirit and scope of the present invention.

Normalizing step 62 may further include the sub-steps of first subtracting, on a per order basis, the non-misfire metric 38 from the misfire detection metric 44 to obtain constituent complex quantities (one for each order). Further sub-steps may include calculating a respective magnitude, again on a per order basis, and finally summing all the individual, magnitude terms, as seen by reference to the generalized equation (10) below:

Normalized Misfire Detection Metric 46=($|a_1-\bar{a}_{1\_n}|$)+($|a_2-\bar{a}_{2\_n}|$)+ ... +($|a_p-\bar{a}_{p\_n}|$) (10)

Each constituent item is a complex number, so the real and imaginary portions need to be subtracted and then the magnitude found for each term. The individual magnitudes are then summed. Note, that for equation (10), the present invention contemplates at least two metrics: (1) one for a single cylinder misfire; and (2) one for a multiple cylinder (e.g., cylinder pair) misfire. The method then proceeds to step 64.

Step 64 involves detecting a misfire condition when the normalized misfire detection metric 46 satisfies a predetermined threshold. The detecting step 64 may include the sub-steps of determining prevailing engine speed and load parameter values, and retrieving a predetermined threshold value based on the engine speed and load (as well as based on single cylinder misfire or multiple cylinder misfire). Note this is not a complex quantity in light of the calculation in equation (10), but rather just a magnitude. The method proceeds to step 66.

Step 66 involves generating an output signal indicating the misfire condition (either single cylinder misfire flag, multiple cylinder misfire flag, or set flags for both). Outputting step 66 may also involve generating an identification of the single cylinder that misfired, or the multiple cylinders involved in the misfire. The sub-step of generating the cylinder identification may involve determining the phase of the normalized misfire detection metric 46 or a specific order of the metric. This is calculated on a fashion similar to equation (10) except that after the subtraction step, a phase term is obtained from a selected term (order). In an alternate embodiment, a sum of the phases (i.e., from the individual terms) may be calculated and used.

Random/Low Level Misfire

As described above, another embodiment of the present invention is adapted to improve detectability of misfires that occur randomly or at a low level. Random or low level misfires are slightly different than continuous misfires as a set harmonic pattern does not get established on the crankshaft. When a set pattern repeats itself and is periodic with the engine cycle period, it is irrelevant when the DFT begins since as long as the period is a multiple of an engine cycle the only difference will be in the phase of the results. A single perturbation (e.g., as by a random misfire) by contrast may slightly vary the speed of the crankshaft initially but whose impact on speed variation subsequently diminishes. For random or low level misfire, it has been discovered that staggered algorithms are preferred to consistently detect misfire. In order to find misfire, it is essential that the energy is concentrated in a window that a metric can view largely uninterrupted. If for instance, only one repeating metric were used then the energy of a misfire could be spread between two consecutive readings with neither being sufficient to trip a misfire flag.

The methodology may be assumed to be otherwise the same as the method illustrated in FIG. 9 (and accompanying text above), subject to the changes as set forth below. Note that the following is applicable to detection of single cylinder misfire—a separate method is performed to detect multiple cylinder misfire.

A DFT that preferably covers at least one engine cycle is started for each rotation of crankshaft 18. It should be understood that the DFT period, however, can be shorter than, or longer than, one engine cycle without losing any generality, and still detect misfire. That is, a respective DFT is preferably performed over at least one engine cycle (i.e., 720 degrees), with a respective DFT commencing after each rotation (i.e., 360 degrees). A DFT that is at least one engine cycle long is started each rotation of the crankshaft.

The speed signal is calculated as described above. Namely, from the timestamp information stored in speed data 40, a speed signal is derived for each tooth over the period defined.

In one embodiment, the speed signal (in RPM) is preferred, and is defined as follows in equation (11).

$$\omega(\theta) = \frac{\Delta\theta}{T_2 - T_1} K_{scaling} \quad (11)$$

Next, the step of converting, as above, may further include the step of selecting a harmonic order. For example, based on the speed and load point (MAP), the method is configured to select which engine orders should be used for the misfire calculation.

Next, again as above, the converting step includes the sub-step of performing a DFT for each selected order, in accordance with equation (12) below:

$$a_k = \frac{1}{N} \sum_{n=0}^{N-1} x(n) e^{-jk\frac{2\pi}{N}n} \quad (12)$$

The real and imaginary parts of the DFT in equation (12) are as set forth in equations (13) and (14) below:

$$a_{k\_real} = \frac{1}{N} \sum_{n=0}^{N-1} x(n) \cdot \cos\left(k\frac{2\pi}{N}n\right) \quad (13)$$

$$a_{k\_imag} = -\frac{1}{N} \sum_{n=0}^{N-1} x(n) \cdot \sin\left(k\frac{2\pi}{N}n\right) \quad (14)$$

For the GM engine described above, one engine cycle was selected (i.e., as the repeating evaluation window). In this regard, the number of samples used was N=40 points. Two different single cylinder misfire detection metrics 46 are contemplated in accordance with this embodiment, with one order each. The metrics are identical although they are offset by one crankshaft rotation.

As above, the next step may optionally include retrieving and using mean (or average) non-misfire metric values based on engine speed and load, as described above. For random or low level misfire, this step can possibly be skipped as neither a target wheel error (generally speaking) or an engine harmonic is expected at the engine cycle frequency. Instead, it is possible to directly use the magnitude. In a general sense, other engines may require content other than the fundamental so combining multiple harmonics and normalizing them could still be advantageous.

The next step involves normalizing the misfire detection metrics to obtain a pair of normalized misfire detection metrics (each associated with a respective rotation of the engine cycle). The method is configured to calculate the misfire detection metrics from the data for each order required and for each DFT performed, the result being set forth in equations (15) and (16) below:

Misfire Metric Rotation $1 = (|a_1 - \overline{a}_{1\_n}|) + (|a_2 - \overline{a}_{2\_n}|) + \ldots + (|a_p - \overline{a}_{p\_n}|)$ (15)

Misfire Metric Rotation $2 = (|a_1 - \overline{a}_{1\_n}|) + (|a_2 - \overline{a}_{2\_n}|) + \ldots + (|a_p - \overline{a}_{p\_n}|)$ (16)

These are complex numbers so the real and imaginary portions need to be subtracted and then the magnitude found for each term.

The next step involves performing a threshold test to see if either metric set out in equations (15) and (16) satisfy a predetermined threshold. If so, the method is configured to indicate which misfire case has occurred. The threshold test will be dependent on speed and load. Additionally, the method is configured to identify the cylinder that caused the misfire. In this embodiment, evaluating Metric 1 ($1^{st}$ rotation DFT) is configured to detect misfire for cylinder 7, 6, 5 and 2. Likewise, evaluating Metric 2 ($2^{nd}$ rotation DFT) is configured to detect misfire for cylinders 8, 4, 3 and 1. The specific, single cylinder that is detected as misfiring is identified based on phase.

There is also the caveat that misfires detected from certain cylinders may actually be caused from the previous engine cycle due to when the DFT was started relative to Top Dead Center of the first cylinder in the engine cycle. In this case, the steps that should be followed are: (a) for the speed and load point, lookup the threshold value; (b) determine if the metrics exceed the threshold value; (c) choose the larger metric; (d) if the phase is valid to indicate a misfire then indicate the respective cylinder; (e) if the phase is out of bounds, check the phase of the lower metric; (f) if the lower metric is above the threshold and the phase in range from step (e), then set the misfire flag and cylinder identification.

The invention claimed is:

1. A method for misfire detection in an internal combustion engine system, comprising the steps of:
   producing a first signal corresponding to rotational characteristics of an engine crankshaft taken at selected times, said first signal including a measure of variability corresponding to characteristics unique to the internal combustion engine system irrespective of misfire;
   converting the first signal into a frequency-domain misfire detection metric having components selected from an engine cycle frequency and harmonic orders thereof;
   normalizing said misfire detection metric using a non-misfire metric corresponding to a non-misfire operating condition of the internal combustion engine system to remove said measure of variability;
   detecting a misfire condition when the normalized misfire detection metric satisfies a predetermined threshold;
   identifying one of (i) an individual cylinder and (ii) multiple cylinders that misfired when said misfire condition is detected as a function of a calculated phase.

2. The method of claim 1 further including the step of:
   selecting the first signal from the group comprising a crankshaft speed signal, a crankshaft acceleration signal, an inverse of the crankshaft speed signal and an inverse of the crankshaft acceleration signal.

3. The method of claim 2 wherein the first signal comprises the inverse of the crankshaft speed signal defining a delta time.

4. The method of claim 2 wherein the first signal comprises the speed signal.

5. The method of claim 4 wherein said step of producing a speed signal includes the sub-steps of:
   recording said selected times at predetermined, known angular positions of said crankshaft;
   developing said speed signal in accordance with said known, angular positions and said recorded times.

6. The method of claim 1 wherein said internal combustion engine system includes a target wheel configured for rotation with said crankshaft, said target wheel being configured for use with a crankshaft sensor for sensing an angular position of said crankshaft, said target wheel including a plurality of radially-outwardly projecting teeth separated by intervening slots, said measure of variability including deviations due to tooth errors and engine variations.

7. The method of claim 6 further including the step of:
establishing said non-misfire metric as a function of engine speed and load on a per harmonic order basis.

8. The method of claim 7 further including the steps of:
determining engine operating speed and load parameters;
retrieving values for said non-misfire metric as a function of said determined engine operating speed and load parameters.

9. The method of claim 8 wherein said step of determining said speed and load parameters includes the sub-step of measuring a manifold absolute pressure (MAP) value associated with said internal combustion engine system.

10. The method of claim 8 wherein said step of determining said speed and load parameters include the sub-step of measuring a mass air flow (MAF) value associated with said internal combustion engine system.

11. The method of claim 8 wherein said step of determining said speed and load parameters include the sub-step of measuring a throttle position value associated with said internal combustion engine system.

12. The method of claim 6 wherein said converting step includes the sub-step of:
defining a sampling interval during which said first signal is defined in N samples;
selecting at least one harmonic order;
applying a Discrete Fourier Transform (DFT) to the first signal comprising N samples to obtain said misfire detection metric for the selected harmonic order.

13. The method of claim 12 wherein said step of selecting a harmonic order includes selecting a plurality of harmonic orders.

14. The method of claim 13 wherein said misfire detection metric comprises a real portion and an imaginary portion, said step of selecting at least one harmonic order comprising the sub-step of:
selecting one of (i) individual cylinder and (ii) multiple cylinder misfire detection;
defining said at least one harmonic order as the engine cycle order when individual cylinder misfire detection is selected;
defining said at least one harmonic order as the engine rotation order when multiple cylinder misfire detection is selected.

15. The method of claim 14 wherein said multiple cylinder misfire corresponds to at least one of an adjacent pair cylinder misfire, opposing pair cylinder misfire and at least a plurality of cylinder misfiring.

16. The method of claim 14 further comprising the step of:
defining said sampling interval as two engine cycles;
selecting the number of samples N during said sampling interval from a range of between about 80 and 240 and preferably 80.

17. The method of claim 14 wherein said sampling interval is a first sampling interval and said step of applying a DFT is a first DFT, said method further including the steps of:
defining a second sampling interval over which a second DFT is performed;
staggering the first and second sampling intervals by a predetermined amount for detecting random or low level misfire.

18. The method of claim 17 wherein said predetermined amount of staggering corresponds to one crankshaft revolution, and said first and second sampling intervals correspond to one engine cycle.

19. The method of claim 18 wherein said step of normalizing said misfire detection metric is performed for each of the first and second sampling intervals.

* * * * *